(12) United States Patent
Yasuzaki

(10) Patent No.: US 8,564,853 B2
(45) Date of Patent: Oct. 22, 2013

(54) IMAGE-READING METHOD AND APPARATUS

(71) Applicant: Canon Kabushiki Kaisha, Tokyo (JP)

(72) Inventor: Koji Yasuzaki, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/845,527

(22) Filed: Mar. 18, 2013

(65) Prior Publication Data

US 2013/0215479 A1  Aug. 22, 2013

Related U.S. Application Data

(63) Continuation of application No. 13/175,593, filed on Jul. 1, 2011, now Pat. No. 8,422,064, which is a continuation of application No. 12/187,372, filed on Aug. 6, 2008, now Pat. No. 7,999,962.

(30) Foreign Application Priority Data

Aug. 10, 2007  (JP) ................................. 2007-208734

(51) Int. Cl.
*G06F 3/12*  (2006.01)
*H04N 1/04*  (2006.01)

(52) U.S. Cl.
USPC ........................ 358/474; 358/497; 358/1.15

(58) Field of Classification Search
USPC .................................. 358/474, 471, 406, 461
See application file for complete search history.

(56) References Cited

U.S. PATENT DOCUMENTS 7,133,165 B2 * 11/2006 Yamada et al. ................ 358/474
2007/0002396 A1 * 1/2007 Naruse .......................... 358/474

* cited by examiner

*Primary Examiner* — Charlotte M Baker
*Assistant Examiner* — Rury Grisham
(74) *Attorney, Agent, or Firm* — Canon USA Inc. IP Division

(57) ABSTRACT

An image-reading apparatus and method for controlling the image-reading apparatus including a document plate where an original document is placed, a line image sensor that reads an image on the document plate by scanning to obtain image data, a reference-setting image that is placed outside a region of the document plate at a position where the line image sensor is able to read the reference-setting image, and a control unit configured to set a reference position when the image sensor reads the image, wherein the control unit detects the reference-setting image from the image data and, depending on a power-on state of the image-reading apparatus, selects the manner in which the reference position is set based on the reference-setting image.

15 Claims, 6 Drawing Sheets

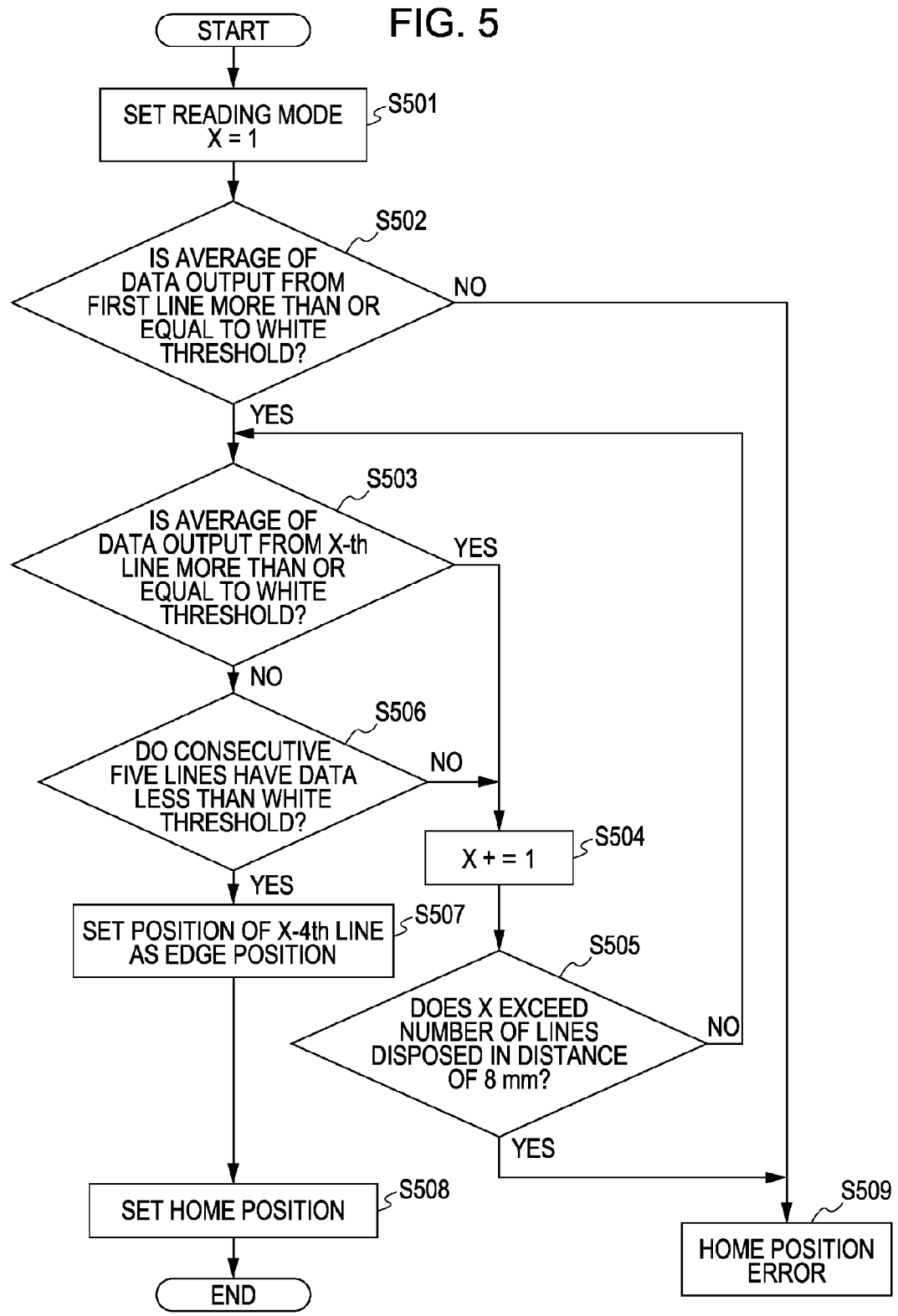

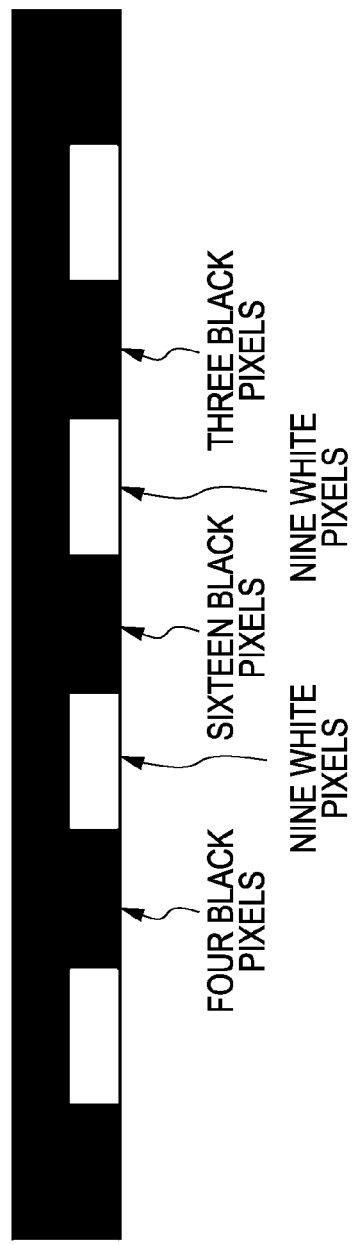

IMAGE-READING METHOD AND APPARATUS

CROSS REFERENCE TO RELATED APPLICATIONS

This application is a Continuation of U.S. patent application Ser. No. 13/175,593 filed Jul. 1, 2011, which is a Continuation of U.S. patent application Ser. No. 12/187,372 filed Aug. 6, 2008, which claims priority from Japanese Patent Application No. 2007-208734 filed Aug. 10, 2007, all of which are hereby incorporated by reference in their entirety.

BACKGROUND OF THE INVENTION

1. Field of the Invention

The present invention relates to an image-reading apparatus, more specifically an image-reading apparatus including a movable image-reading unit.

2. Description of the Related Art

In the related art, in some reading apparatuses, the value of a position counter that indicates a position of an image sensor is stored in a memory such as static-random-access memory (SRAM). When it is determined that the value of the position counter is a normal value, reading of a prepared black-and-white reference board is performed. When the black-and-white reference board has been detected, the image sensor is moved from the position of the black-and-white reference board to a reference position. In addition, U.S. Pat. No. 7,133,165 discloses a method for reading the black-and-white reference board in a case in where it is determined that the value of the position counter is an abnormal value. More specifically, an image sensor is moved in a direction of an origin point, and a temporary reference position is set. Then, reading of the black-and-white reference board is performed while the image sensor is being moved from the temporary reference position. As a result, when the black-and-white reference board has been detected, the image sensor is moved to the original reference position.

However, in the abovementioned reading apparatus, because it is determined only whether the value of the position counter is a normal value or an abnormal value, when the reading apparatus is not properly operated because of a failure other than the counter, it is difficult to set the home position while dealing with the failure. Additionally, because a process of setting the reference position is performed regardless of a power-on state of the reading apparatus, there is a problem, for example, the process of setting the reference position takes a certain time in all cases.

In view of the above-described circumstances, the present invention provides a reading apparatus in which the manner in which the reference position that is used to read an image is set differently depending on the power-on state of the reading apparatus. The reading apparatus can reduce processing time for setting the reference position.

SUMMARY OF THE INVENTION

An embodiment of the present invention provides an image-reading apparatus. The image-reading apparatus includes the following elements: a document plate where an original document is placed, a line image sensor that reads an image on the document plate by scanning to obtain image data, a reference-setting image that is placed outside a region of the document plate at a position where the line image sensor is able to read the reference-setting image, and a control unit configured to set a reference position when the image sensor reads the image, wherein the control unit detects the reference-setting image from the image data and, depending on a power-on state of the image-reading apparatus, selects the manner in which the reference position is set based on the reference-setting image.

Another embodiment of the present invention provides a method for controlling an image-reading apparatus including a document plate where an original document is placed, a line image sensor that reads an image on the document plate by scanning to obtain image data, a reference-setting image placed outside a region of the document plate where the image is placed at a position that the line image sensor is able to read the reference-setting image, the reference-setting image including a plurality of pattern images, and a control unit configured to set a reference position when the image sensor reads the image including the steps of: detecting the plurality of pattern images from the image data, and setting on the basis of positions at which the line image sensor has detected the plurality of pattern images, the reference position used to scan the image, wherein the selection of the reference position performed by the control unit differs depending on whether a power-on state of the image-reading apparatus is a hardware-power-on state or a software-power-on state.

Moreover, according to an embodiment of the present invention, the manner in which the reference position of an image-reading unit is set differs depending on the power-on state of the image-reading apparatus. Accordingly, a preparation time until reading of an image is performed can be reduced.

Further features of the present invention will become apparent from the following description of exemplary embodiments (with reference to the attached drawings).

BRIEF DESCRIPTION OF THE DRAWINGS

FIG. 5 is a flowchart of a black-and-white-edge-detection process according to the embodiment of the present invention.

FIG. 6 is a schematic sectional view of a black-and-white-pattern sheet mounted in the MFP apparatus according to the embodiment of the present invention.

DESCRIPTION OF THE EMBODIMENTS

Embodiments of the present invention will be described in detail as examples with reference to the accompanying drawings.

Figure 1:
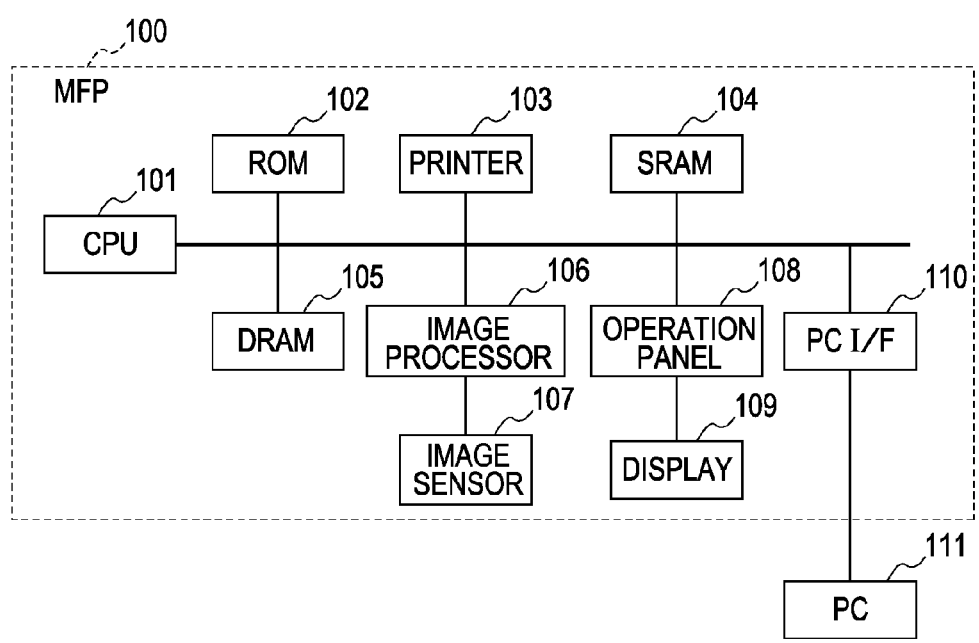
FIG. 1 is a block diagram of a configuration of a multifunction peripheral (MFP) apparatus according to an embodiment of the present invention.

FIG. 1 is a block diagram of a circuit configuration of an MFP apparatus 100 having an image-reading function and a printer function. A central processing unit (CPU) 101 is a system control unit of the MFP apparatus 100, and exercises overall control of the MFP apparatus 100. A read-only memory (ROM) 102 stores a control program for controlling a system of the MFP apparatus 100. The CPU 101 performs various types of operations associated with the MFP apparatus 100 on the basis of the control program that is stored in the ROM 102. Such a control program executed by the CPU 101 is not limited to the control program that is stored in the ROM 102. A control program that is stored in an external storage medium, such as a compact disk read-only memory (CD-ROM), may be used. The control program stored in an external storage medium may be read using a dedicated reading apparatus to be loaded into a random-access memory (RAM) (for example, an SRAM 104) of the MFP apparatus 100, and may be executed by the CPU 101.

A printer 103 prints image data that has been input on a recording sheet.

The SRAM 104 mainly stores registration data that is registered for the MFP apparatus 100 and so forth. The registration data that is registered for the MFP apparatus 100 is, for example, data associated with reading resolution. A dynamic RAM (DRAM) 105 mainly stores image data.

An image processor 106 performs various types of image processing on image data that has been input by an image sensor 107. The image sensor 107 is a line image sensor that reads an image on an original document placed on a transparent document plate by scanning, and may be a contact image sensor or the like. The image sensor 107 is driven by a motor (not shown) to perform scanning of an image.

An operation panel 108 includes a display 109 that displays a state of the MFP apparatus 100 and so forth. A user can use the operation panel 108 to input an operation instruction, to register various types of data, and to check the state of the MFP apparatus 100 via the display 109.

The operation panel 108 further includes an apparatus-power-supply switch (not shown). When the apparatus-power-supply switch is turned on for the first time after an external power supply line is connected to the MFP apparatus 100, power is started to be supplied to internal electric circuits. In this case, the CPU 101 is in a power-on reset state, and an initialization program for initializing memories, various types of flags, settings, and so forth is started to be executed. The MFP apparatus 100 is controlled for the first time after the initialization (hereinafter, referred to as a "hardware-power-on state"). After that, when the apparatus-power-supply switch is turned off in a state in which power is supplied using the external power supply line, the CPU 101 halts in a standby state although power is still continued to be supplied (hereinafter, referred to as a "software-power-off state"). In the software-power-off state, power is not supplied to most of the electric circuits of the MFP apparatus 100, and is supplied to at least one portion of electric circuits that monitors the apparatus-power-supply switch and memories. In this case, the software-power-off state appears to the user to be similar to a state in which no power is supplied from the outside.

When the apparatus-power-supply switch is turned on again (hereinafter, referred to as a "software-power-on state"), the CPU 101 recovers from the standby state. Instead of the initialization program that has been executed in the power-on reset state, a program for the software-power-on state is started to be executed. The MFP apparatus 100 has a unit configured to determine whether the MFP apparatus 100 is in the hardware-power-on state or in the software-power-on state when the apparatus-power-supply switch is turned on.

A personal computer (PC) interface (I/F) 110 is an interface used to connect the MFP apparatus 100 to a PC 111. The PC 111 is a host computer capable of, via the PC I/F 110, changing various types of data that has been set, and requesting activation of various types of operations.

Figure 2:
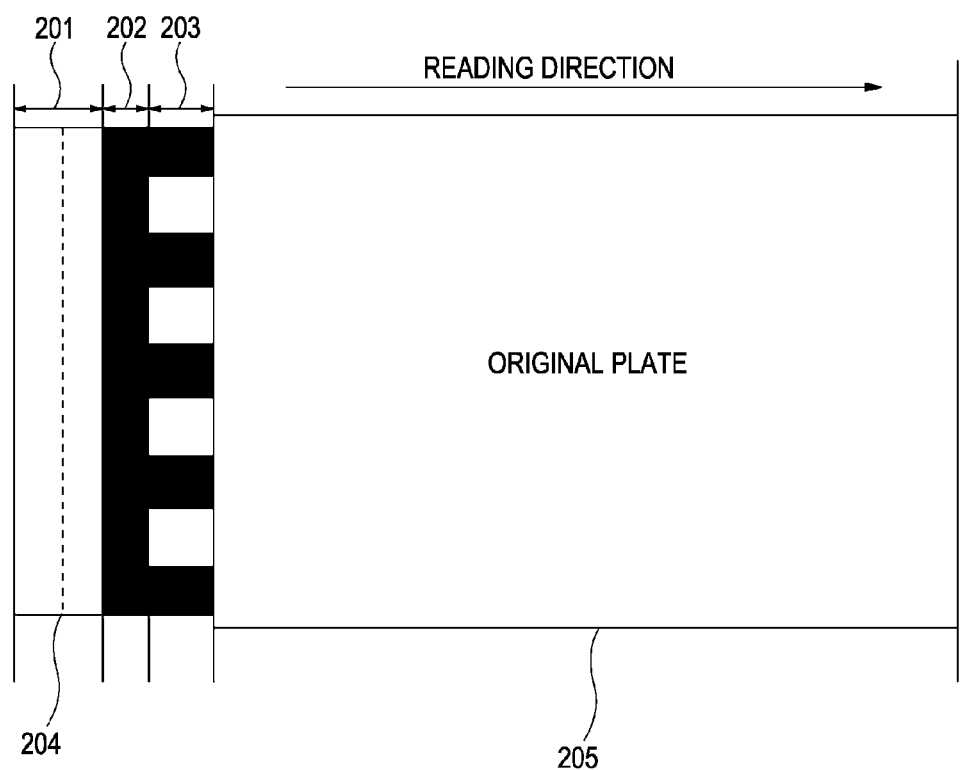
FIG. 2 is a schematic diagram showing the positional relationship between an image sensor and a home position in the MFP apparatus according to the embodiment of the present invention.

FIG. 2 is a diagram showing the positional relationship between, the document plate of the MFP apparatus 100, an image-reading region in which the image sensor 107 can read an image, a reference position (hereinafter, referred to as a "home position") of the image sensor 107, and patterns used to determine the home position that is used to read an image by scanning. A document plate 205 indicates a region in which an A4-size sheet can be placed. The image sensor 107 can be moved outside a region in which an original document can be placed. In this embodiment, a portion at the left side of the document plate 205 shown in FIG. 2 is also included in a region in which the image sensor 107 can read an image (hereinafter, referred to as an "image-reading region"). A black-and-white-pattern sheet is provided outside the region in which an original document can be placed, and provided in the image-reading region in which the image sensor 107 can read an image. The image sensor 107, which is a line image sensor, is provided in the shape of a vertically extending line in the top-to-bottom direction shown in FIG. 2. The image sensor 107 is moved so that it can scan an image from the left to the right in a direction perpendicular to the vertically extending line, thereby reading two-dimensional image data.

The home position of the image sensor 107 is set as a home position 204 (indicated by the broken line) in the vicinity of the edge of the document plate. In the MFP apparatus 100, as shown in FIG. 2, a white sheet is attached in the image-reading region, and positioned so as to face the image sensor 107 that is positioned in the vicinity of the home position. More specifically, in an example shown in FIG. 2, a white sheet having a predetermined width 201 (a width of 6.5 mm) is attached to the document plate 205.

Additionally, at a position a predetermined distance from the home position 204, a sheet (a black sheet) that is used to determine a boundary position and that has a predetermined width 202 (a width of 1 mm) is attached to the document plate 205.

Furthermore, at a position different from that of the sheet used to determine the boundary position, a sheet that is provided to determine a temporary home position is attached to the document plate 205. More specifically, at a position a certain distance from the home position 204, a black-and-white-checked sheet (a black-and-white-pattern sheet) having a predetermined width 203 (a width of 1.5 mm) is attached to the document plate 205. A position 4.5 mm left from the boundary position between the white sheet having the predetermined width 201 and the black sheet having the predetermined width 202 is the home position 204 of the image sensor 107. A position 2 mm left from the home position 204 is a left-end position at which movement of the image sensor 107 is limited. At the left-end position at which movement of the image sensor 107 is limited, a blocking member is disposed.

Positioning of the image sensor 107 in a scanning direction is performed by detecting a black-and-white edge at the boundary between the white sheet having the predetermined width 201 and the black sheet having the predetermined width 202, whereby the home position 204 can be determined. The black-and-white edge is an edge pattern (a second pattern) parallel to the line of the image sensor 107, which is a line image sensor. Additionally, detection of the black-and-white-pattern sheet (a first pattern) having the predetermined width 203 is performed, and the image sensor 107 is moved to the temporary home position. Then, the black-and-white edge can be detected.

In this embodiment, in order to determine the home position, the MFP apparatus 100 has a configuration in which the above-described position relationship and the above-described shapes of the sheets are used. The position relationship and the shapes of the sheets are not limited thereto, and can be modified.

Figure 3:
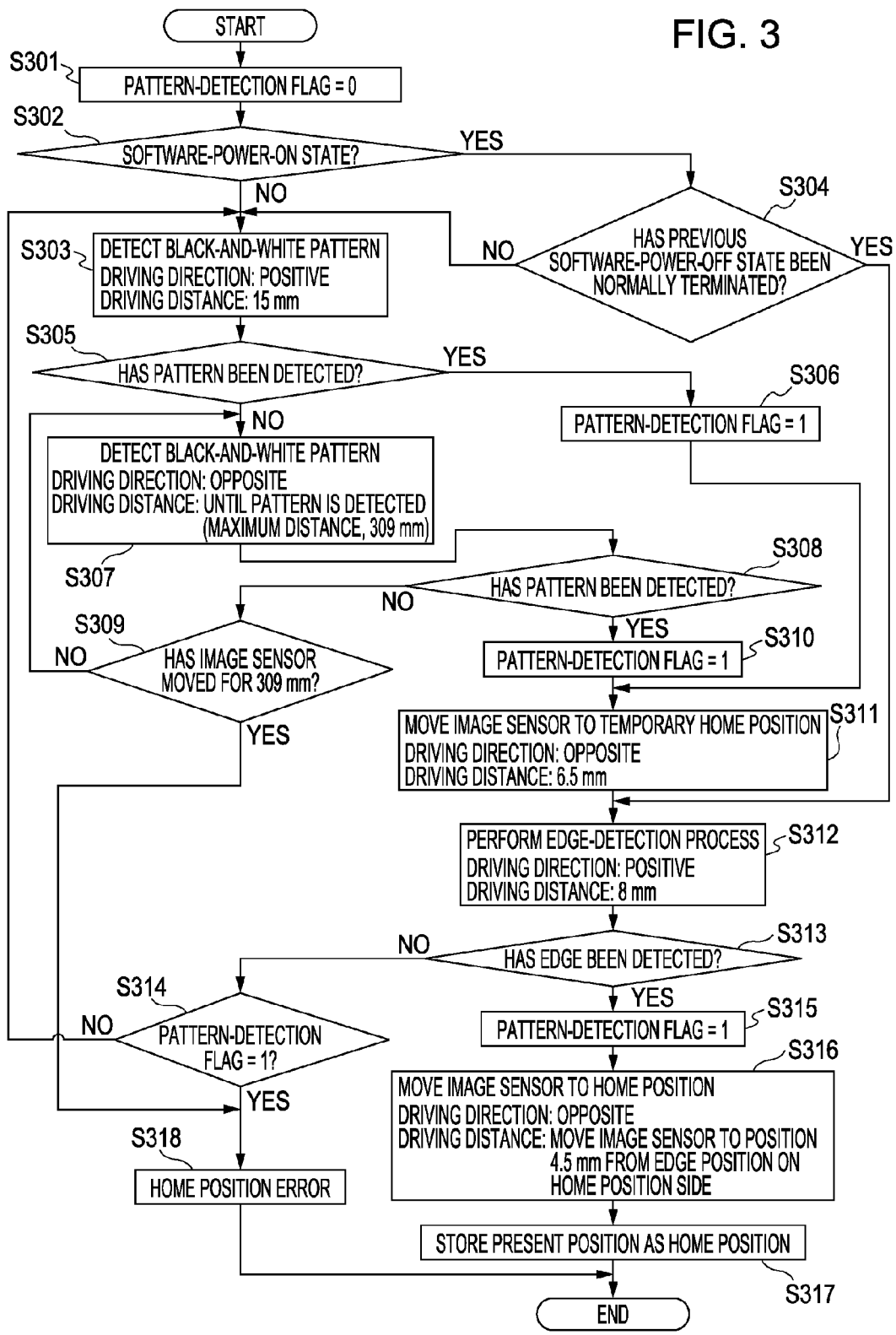
FIG. 3 is a flowchart of a home-position-setting process according to the embodiment of the present invention.

FIG. 3 is a flowchart of a home-position-setting process in which, after it is determined whether a power-on state of the MFP apparatus 100 is the hardware-power-on state or the software-power-on state, the home position of the image sensor 107 is set in the determined power-on state.

First, before the home-position-setting process is performed, in step S301, a black-and-white-pattern-sheet-detection flag and a black-and-white-edge-detection flag are cleared. The black-and-white-pattern-sheet-detection flag and the black-and-white-edge-detection flag show whether the black-and-white-pattern sheet and the black-and-white edge, which are shown in FIGS. 2 and 6, are detected, respectively. Next, in step S302, the power-on state of the MFP apparatus 100 that is an image-reading apparatus is determined. When the power-on state is the hardware-power-on state, the process proceeds to step S303. When the power-on state is the software-power-on state, the process proceeds to step S304. In the present invention, the manner in which the home position of the image sensor 107 is set differs depending on whether the power-on state is the hardware-power-on state or the software-power-on state.

(1) Setting Home Position of Image Sensor in Hardware-Power-on State

When the process proceeds to step S303 because the power-on state is the hardware-power-on state, detection of the black-and-white-pattern sheet is performed. The image sensor 107 is driven in a positive direction (a reading direction shown in FIG. 2) so that it can scan the black-and-white-pattern sheet. The detection of the black-and-white-pattern sheet is performed within a driving distance whose maximum is 15 mm. A method for detecting the black-and-white-pattern sheet is described below.

When the black-and-white-pattern sheet is detected in step S305, the black-and-white-pattern-sheet-detection flag is set in step S306. When the black-and-white-pattern sheet is not detected, that indicates that the image sensor 107 is positioned somewhere over the document plate (on the right side of the black-and-white-pattern sheet) shown in FIG. 2. Accordingly, the process proceeds to step S307, and, in step S307, detection of the black-and-white-pattern sheet is performed within a driving range whose maximum is 309 mm while the image sensor 107 is being driven in the opposite direction (a direction opposite to the reading direction shown in FIG. 2) so that the image sensor 107 can scan the black-and-white-pattern sheet. In a case in which the black-and-white-pattern sheet is not detected in step S308, when it is determined in step S309 that the image sensor 107 was driven for 309 mm or more, it is determined in step S318 that a home-position error has occurred. When it is determined in step S308 that the black-and-white-pattern sheet has been detected, in step S310, the black-and-white-pattern-sheet-detection flag is set.

When it is determined in steps S305 and S308 that the black-and-white-pattern sheet has been detected, detection of the black-and-white edge shown in FIG. 2 is performed in step S312 in order to determine the home position. In step S311, in order to start detection of the black-and-white edge, the image sensor 107 is moved to the temporary home position (a position that is 6.5 mm from a position at which the black-and-white-pattern sheet is detected in the opposite direction). In step S312, detection of the black-and-white edge is performed while the image sensor 107 is being driven in the positive direction from the temporary home position (the maximum driving distance is 8 mm). In other words, in step S307, detection of the black-and-white-pattern sheet is performed while the image sensor 107 is scanning in the opposite direction. When the black-and-white-pattern sheet has been detected, in step S310, the black-and-white-pattern-sheet-detection flag is set. After that, the image sensor 107 is moved to the temporary home position while further scanning in the opposite direction, and then, detection of the black-and-white edge is performed while the image sensor 107 is scanning in the reading direction.

When it is determined in step S313 that the black-and-white edge has been detected as a result of the detection of the black-and-white edge, the process proceeds to step S315. In step S315, the black-and-white-edge-detection flag is set. Then, in step S316, in order to determine the home position, the image sensor 107 is moved 4.5 mm from the position at which the black-and-white edge is detected in the opposite direction. In step S317, the present position of the image sensor 107 is determined as the home position, and is stored in the RAM or the like. When it is determined in step S313 that the black-and-white edge is not detected, the process proceeds to step S314. When it is determined in step S314 that the black-and-white-pattern-sheet-detection flag has been set, the process proceeds to step S318, and it is determined in step S318 that the home-position error has occurred. When the black-and-white-pattern-sheet-detection flag is not set, the process proceeds to step S303, and a black-and-white-pattern-sheet-detection process is started.

(2) Setting Home Position of Image Sensor in Software-Power-on State

When it has been determined in step S302 that the power-on state of the MFP apparatus 100 is the software-power-on state, it is checked in step S304 whether or not the previous software-power-off state has been normally terminated. Even in the case of the software-power-on state, detection of the black-and-white edge is performed, and checking of the home position is performed. The reason for this is that there is a possibility that a standby position of the image sensor 107 may be shifted because of software error. More specifically, in the case in which the previous software-power-off state of the MFP apparatus 100 has been abnormally terminated (error termination has occurred), the process proceeds to step S303, and the black-and-white-pattern-sheet-detection process is performed. When the previous software-power-off state has been normally terminated, the process proceeds to step S312. In step S312, detection of the black-and-white edge is performed to determine the home position. Basically, the MFP apparatus 100 is designed so as to be positioned at the home position in the software-power-on state. However, checking of the home position is performed as a precaution. The MFP apparatus 100 may have a configuration in which checking of the home position is not necessary and in which activation of the MFP apparatus 100 is performed without any additional operation.

As described above, (1) when the MFP apparatus 100 is initially activated in the hardware-power-on state, detection of the black-and-white-pattern sheet is performed to check the present position. When checking of the present position has been successful, next, detection of the black-and-white edge is performed to determine the home position. When checking of the present position has failed, an error message is displayed to notify the user of the failure. (2) When the MFP apparatus 100 has been activated two or more times, i.e., when the MFP apparatus 100 is activated in the software-power-on state, only detection of the black-and-white edge is performed to determine the home position. In this case, detection of the black-and-white-pattern sheet is not performed. However, also in the case of the software-power-on state, when the previous software-power-off state of the MFP apparatus 100 has been abnormally terminated, a process the same as that in the hardware-power-on state, i.e., a process in which detection of the black-and-white-pattern sheet is performed to check the present position, is performed. When checking of the present position has been successful, detection of the black-and-white edge is performed to determine the home position. When checking of the present position has failed, it is determined that an error has occurred. In the case of the software-power-on state, when the previous software-power-off state of the MFP apparatus 100 has been normally terminated, only detection of the boundary edge between the white and black sheets is performed to set the home position of the image sensor 107. In the present invention, the manner in which the home position of the image sensor 107 is set differs depending on whether the power-on state is the hardware-power-on state or the software-power-on state. The manner in which the home position of the image sensor 107 is set differs depending on mechanical configurations and characteristics of MFP apparatuses, and is not limited thereto. Various types of manners can be used.

Figure 4:
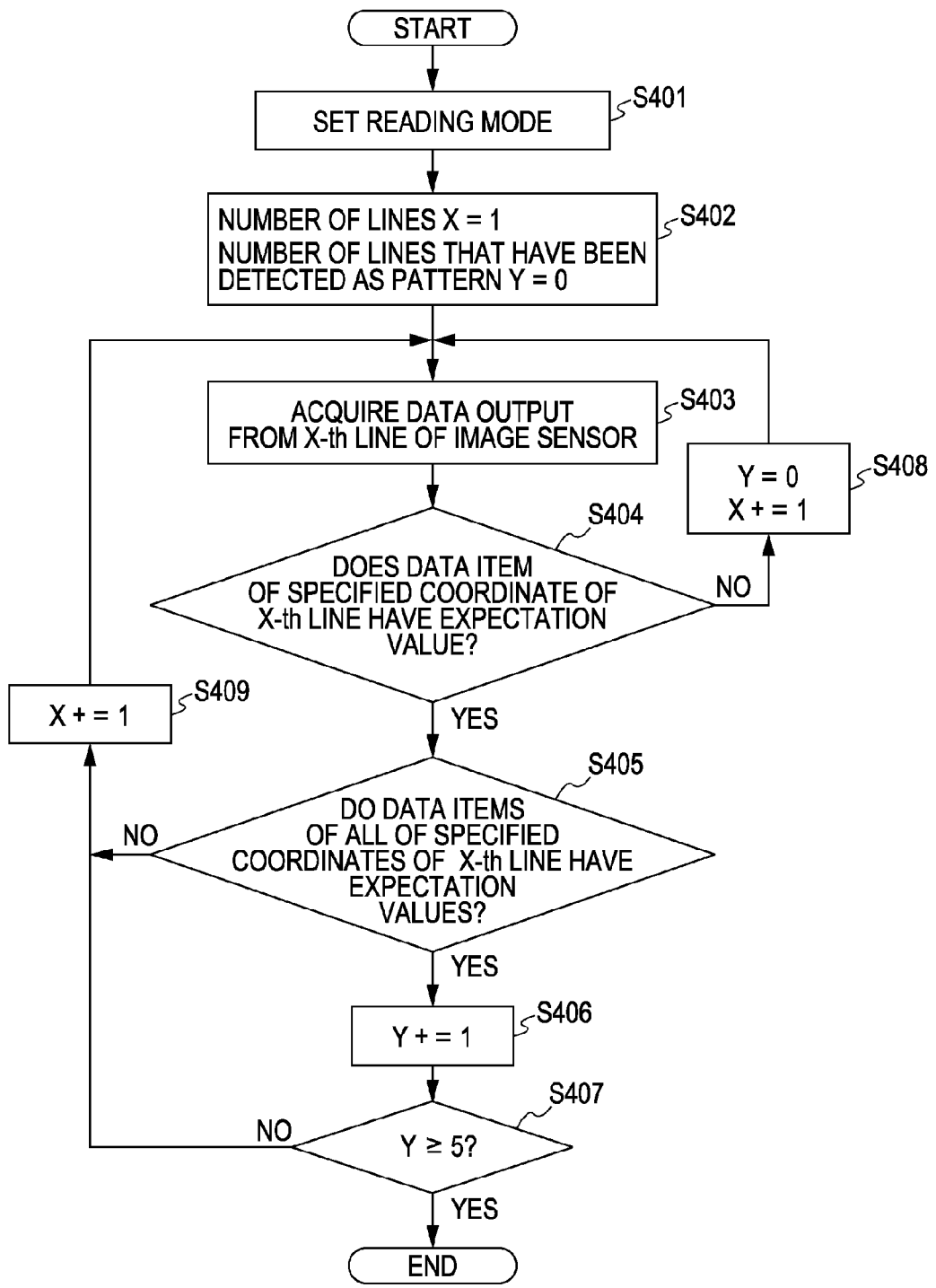
FIG. 4 is a flowchart of a black-and-white-pattern-sheet-detection process according to the embodiment of the present invention.

FIG. 4 is a flowchart of the black-and-white-pattern-sheet-detection process of steps S303 and S307 shown in FIG. 3.

First, in order to detect the black-and-white-pattern sheet, in step S401, setting of a reading mode of the MFP apparatus 100 is performed. The reading mode of the MFP apparatus 100 is set to a monochrome binary mode. A resolution in the main scanning direction of the image sensor 107 is set to a predetermined resolution (for example, 24 pixels/mm), and a resolution in a sub-scanning direction is set to a predetermined resolution (for example, 24 pixels/mm). An image is to be read using the resolutions. Additionally, a buffer memory corresponding to one line is prepared for analysis of output data. In step S402, a counter, which shows that data of an X-th line from the first line is being read, and a counter Y (hereinafter, referred to as a "black-and-white-pattern-detection counter"), which shows how many lines have been continuously detected as a black-and-white pattern, are initialized.

In step S403, data output from the X-th line of the image sensor 107 is acquired in the buffer memory corresponding to one line. In step S404, detection of the black-and-white pattern is performed using the data stored in the buffer memory to determine whether the data output from the X-th line is recognized as the black-and-white pattern shown in FIG. 6. FIG. 6 is an enlarged view showing the black-and-white-pattern sheet shown in FIG. 2. In this embodiment, data comparison is performed on data items of certain specified coordinates shown in FIG. 6, whereby detection of the black-and-white pattern is performed. For example, a data item is output from the 1000-th pixel from the left end (the home position) of the image sensor 107, and it is determined whether the data item is black data. In such a case, a data item of a certain specified coordinate that is set in advance is obtained, and it is determined whether the data item has an expectation value (see FIG. 6).

When a value output from the image sensor 107 is an expectation value of white data, the relationship that the expectation value of white data≤a white threshold is obtained. When a value output from the image sensor 107 is an expectation value of black data, the relationship that the expectation value of black data≥a black threshold is obtained. The white threshold is a minimum value that is output as a data item from the image sensor 107 even under various arbitrary conditions (for example, light adjustment is not performed) in a case in which the image sensor 107 reads a white pattern. The black threshold is a maximum value that is output as a data item from the image sensor 107 even under various arbitrary conditions (for example, offset calculation is not performed) in a case in which the image sensor 107 reads a black pattern. In other words, when a value that is output as a read data item from the image sensor 107 has a certain level, it is determined that the read data item is as white data. When a value that is output as a read data item from the image sensor 107 has another certain level, it is determined that the read data item is black data. The determination is performed under various arbitrary conditions that influence a value output from the image sensor 107.

A detection region is a specified region (for example, 10 mm in the left and right directions), and the center of the specified region is a shaft of the image sensor 107. In step S405, it is determined whether data items of all of specified coordinates that are set in advance have corresponding expectation values. When the data items of all of the specified coordinates have corresponding expectation values, the process proceeds to step S406, and the black-and-white-pattern-detection counter is incremented by 1. When even only one data that does not have a corresponding expectation value is included in the data items of all of the specified coordinates, the process proceeds to step S408. In step S408, the motor is driven so that the image sensor 107 is shifted by one line, and the black-and-white-pattern-detection counter is cleared. In the present invention, only when the data items of all of the specified coordinates are recognized as corresponding expectation patterns, the data output from the X-th line is determined as the black-and-white pattern. However, there is a probability that an influence of dust on the sheets is needed to be considered depending on the configuration of the MFP apparatus 100. For this reason, the MFP apparatus 100 may have a configuration in which, even when not all of the data items of the specified coordinates have the corresponding expectation values, the data output from the X-th line is determined as the black-and-white pattern. For example, all of the data items of the specified coordinates are supposed to have 50 points. In a case in which an expectation value is 45 points, when all of the data items of the specified coordinates have expectation values of 45 points, the data output from the X-th line may be determined as the black-and-white pattern. In all cases, conditions for detecting the black-and-white pattern may be determined on the basis of various conditions such as the configuration and specification of the MFP apparatus 100.

In step S407, it is determined whether the value of the black-and-white-pattern-detection counter is more than or equal to a certain value (for example, five lines). When the value of the black-and-white-pattern-detection counter is less that a certain value (for example, five lines), the process proceeds to step S409, and the motor is driven so that the image sensor 107 is shifted by one line. In contrast, when the value of the black-and-white-pattern-detection counter is more than or equal to a certain value (for example, five lines), the black-and-white-pattern-sheet-detection process ends, and the black-and-white-edge-detection process is performed in order to determine the home position. When the black-and-white-pattern sheet is not detected although detection of the black-and-white-pattern sheet has been performed over a region in which the image sensor 107 can be moved, it is determined that an error has occurred.

FIG. 5 is a flowchart of the black-and-white-edge-detection process of step S312 shown in FIG. 3.

In step S501, setting of the reading mode of the MFP apparatus 100 is performed. The reading mode of the MFP apparatus 100 is set to the monochrome binary mode. A resolution in the main scanning direction of the image sensor 107 is set to a predetermined resolution (for example, 12 pixels/mm), and a resolution in the sub-scanning direction is set to a predetermined resolution (for example, 24 pixels/mm). An image is to be read using the resolutions. Detection of the black-and-white edge is performed using a function of outputting the average data of specified pixels. In the function, the average of data output from pixels disposed in a specified region (for example, a region from the left end to the 100-th pixel) of the image sensor 107 is output.

In step S502, it is determined whether or not an average value A of data that the image sensor 107 has read can be recognized as white data (whether or not the average value A of data that the image sensor 107 has read is an expectation value). The expectation value is similar to that in step S404 shown in FIG. 4. A reading line of the image sensor 107 is not completely parallel to the black-and-white edge. The reading line is inclined to the black-and-white edge, and the degree of the inclination falls within a range of assembly accuracy of the MFP apparatus 100. For this reason, the average value A of data read output from the pixels disposed in the specified region is used. Additionally, in order to reduce an influence of noise caused by dirt, the average value A is used.

When the average value A is more than or equal to the white threshold, the average value A is recognized as white data, and the process proceeds to step S503 in which black data is to be detected. When the average value A is less than the white threshold, the process proceeds to step S509, where it is determined that home position error has occurred. In this case, the reason why detection of white data is performed is that detection of the black-and-white edge is performed after the image sensor 107 is moved to the temporary home position both in a case in which detection of the black-and-white-pattern sheet is performed and in a case in which detection of the black-and-white edge is only performed without performing detection of the black-and-white-pattern sheet. Accordingly, all of the data can be obtained as white data at an initialization position. Otherwise, it is determined that an error has occurred.

After white data is detected in step S502, detection of black data is performed in step S503. As a method for detecting black data, data is acquired on a one-line-by-one-line basis using the resolution in the sub-scanning direction, which has been set in step S501, i.e., in the step of setting the reading mode. When the average value A is less than the white threshold, the data is recognized as black data. After black data is detected in step S503, it is checked in step S506 whether consecutive lines (for example, five lines) have black data. The reason why a plurality of lines are checked is that, when only one line is checked, there is a probability that undesired data is obtained. When it has been checked that the plurality of lines have black data, it is determined in step S507 that a black edge has been detected.

In step S504, the motor is driven by one line. In step S505, when no black data is detected although detection of black data has been performed even over a predetermined distance (for example, 8 mm), the process proceeds to step S509, and it is determined that the home position error has occurred. When the black edge has been detected, in step S508, a position that is a specified distance from the position of the black edge is set as the home position, and the process ends.

In step S304 in the present invention, whether the previous software-power-off state has been normally terminated is checked by checking a history of a flag of an error termination or the like. For example, when an error has occurred in step S318 shown in FIG. 3 or in step S509 shown in FIG. 5, an error flag is set. The error flag can be checked.

In the foregoing embodiment, the MFP apparatus 100 having a configuration in which the image sensor 107 is driven by a pulse motor is described. The configuration is not limited thereto. For example, a direct current (DC) motor having an encoder or the like may be used. When the DC motor is used, it is comparatively easy to obtain information concerning the present position or the like since the encoder is mounted in the DC motor. Additionally, as checking of the present position in the hardware-power-on state, the image sensor 107 may be caused to be collided with the blocking member at the left-end position at which movement of the image sensor 107 is limited, thereby initializing the encoder. Then, the home position may be determined. Furthermore, in the software-power-on state, no operation may be performed on the assumption that the MFP apparatus 100 is positioned at the home position. Alternatively, as in the case of the above-mentioned pulse motor, detection of the black-and-white edge or the like may be performed to determine the home position.

In the foregoing embodiment, the CPU 101 included in the MFP apparatus 100 exercises control of the MFP apparatus 100. The PC 111, which is a host computer, may exercise control of the MFP apparatus 100 via PC I/F 110 so that the MFP apparatus 100 can be operated. Additionally, instead of the MFP apparatus 100, an image-reading apparatus having a single function may be controlled by a host computer.

The present invention can also be achieved by providing a storage medium which stores software (program code) for implementing functions of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the functions of the above-described exemplary embodiments. The software (program code) itself and the storage medium which stores the software (program code) constitute the present invention.

The storage medium can be, for example, a floppy disk, a hard disk, a magneto-optical disk, a compact disc-read-only memory (CD-ROM), a CD-recordable (CD-R), a CD-rewritable (CD-RW), a digital versatile disc (DVD)-ROM, a DVD-RAM, a DVD-RW, a DVD+RW, a magnetic tape, a nonvolatile memory card, or a ROM. Further, such software (program code) can be downloaded via a network.

Furthermore, the above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing based on the instructions of the software (program code) to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An apparatus comprising:
   a movement control unit configured to control movement of an image sensor of a scanner for reading an image on a document;

a detecting unit configured to detect a predetermined pattern for specifying a position of the image sensor by obtaining an image read by the image sensor; and a control unit configured to control the movement control unit and the detecting unit depending on a state of the scanner in a case where a power is supplied to the scanner such that, if the state is a first state, the movement control unit cause the image sensor to move in a direction toward the predetermined pattern from a home position of the image sensor and the detecting unit performs detecting of the predetermined pattern for checking a present position of the image sensor, and if the state is a second state, the movement control unit and the detecting unit omit processing for checking the present position of the image sensor.

2. The apparatus according to claim 1, wherein the first state is a state for requiring initializing of the scanner, and the second state is a state for not requiring initializing of the scanner.

3. The apparatus according to claim 1, wherein the first state is a state when the power is supplied to the scanner for the first time after an external power supply line is connected to the scanner.

4. The apparatus according to claim 1, wherein the second state is a state when a software-power state is switched from an off-state to an on-state in a state supplying the power from an external power to the scanner.

5. The apparatus according to claim 1, wherein the predetermined pattern is in a position between the home position and an area for reading an image on a document, and the movement control unit causes the image sensor to move to an opposite direction if the detecting unit did not detect the predetermined pattern for checking the present position of the image sensor.

6. The apparatus according to claim 1, wherein the detecting unit detects a first pattern for checking the present position of the image sensor and a second pattern for causing the image sensor to move to the home position, and the control unit controls the moving control unit and the detecting unit such that moving of the image sensor for detecting the first pattern by the moving control unit and processing for detecting the first pattern by the detecting unit are omitted.

7. The apparatus according to claim 6, wherein the control unit controls the movement control unit and the detecting unit, if the detection unit did not detect the second pattern, such that moving of the image sensor for detecting the first pattern by the moving control unit and processing for detecting the first pattern by the detecting unit are performed even if the stated of the scanner is the second state.

8. A control method of a scanner which reads an image on a document by moving an image sensor, the method comprising:

if a state of the scanner, in a case where a power is supplied to the scanner, is a first state, causing the image sensor to move in a direction toward a predetermined pattern from a home position of the image sensor and performing a detection of the predetermined pattern by obtaining an image read by the moved image sensor for checking the present position of the image sensor; and if a state of the scanner, in a case where the power is supplied to the scanner, is a second state, omitting the movement of the image sensor and the detection of the predetermined pattern for checking the present position of the image sensor.

9. The control method according to claim 8, wherein the first state is a state for requiring initializing of the scanner, and the second state is a state for not requiring initializing of the scanner.

10. The control method according to claim 8, wherein the first state is a state when the power is supplied to the scanner for the first time after an external power supply line is connected to the scanner.

11. The control method according to claim 8, wherein the second state is a state when a software-power state is switched from an off-state to an on-state in a state supplying the power from an external power to the scanner.

12. The control method according to claim 8, wherein the predetermined pattern is in a position between the home position and an area for reading an image on a document, and causing the image sensor to move to an opposite direction if the predetermined pattern is not detected for checking the present position of the image sensor.

13. The control method according to claim 8, wherein the predetermined pattern includes a first pattern for checking the present position of the image sensor and a second pattern for causing the image sensor to move to the home position, if the state of the scanner in a case where the power is supplied to the scanner is the second state, moving of the image sensor for detecting the first pattern by the moving control unit and processing for detecting the first pattern by the detecting unit are omitted.

14. The control method according to claim 13, wherein, if the second pattern is not detected, moving of the image sensor for detecting the first pattern and processing for detecting the first pattern are performed even if the stated of the scanner is the second state.

15. A non-transitory computer-readable storage medium storing computer-executable program for performing the control method of claim 8.

* * * * *